Figure 1:
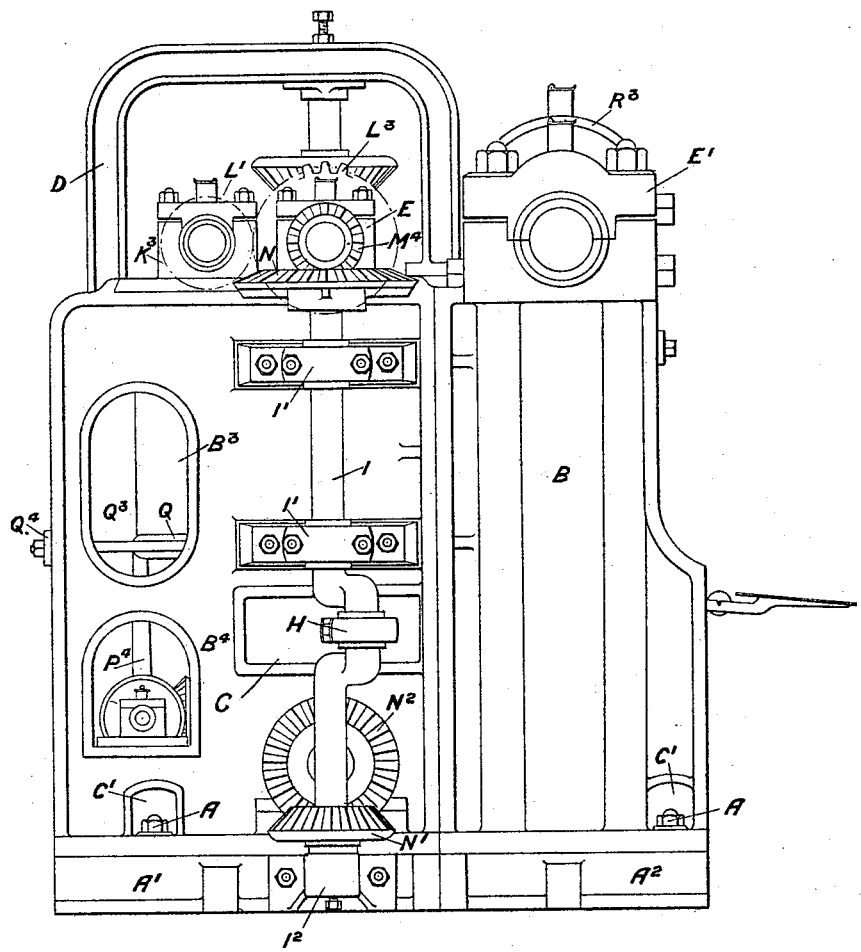

(No Model.) 6 Sheets—Sheet 1.

J. G. NAYLOR & H. WILLIAMS.
APPARATUS FOR PRESSING BRICKS.

No. 490,412. Patented Jan. 24, 1893.

WITNESSES.

INVENTORS.

(No Model.) 6 Sheets—Sheet 2.

J. G. NAYLOR & H. WILLIAMS.
APPARATUS FOR PRESSING BRICKS.

No. 490,412. Patented Jan. 24, 1893.

WITNESSES.

INVENTORS.

(No Model.) 6 Sheets—Sheet 3.

J. G. NAYLOR & H. WILLIAMS.
APPARATUS FOR PRESSING BRICKS.

No. 490,412. Patented Jan. 24, 1893.

WITNESSES.

INVENTORS.

(No Model.)  6 Sheets—Sheet 4.

J. G. NAYLOR & H. WILLIAMS.
APPARATUS FOR PRESSING BRICKS.

No. 490,412. Patented Jan. 24, 1893.

WITNESSES.

INVENTORS.
Joshua G. Naylor.
Harry Williams.

(No Model.) 6 Sheets—Sheet 5.

J. G. NAYLOR & H. WILLIAMS.
APPARATUS FOR PRESSING BRICKS.

No. 490,412. Patented Jan. 24, 1893.

WITNESSES.

INVENTORS.

(No Model.) 6 Sheets—Sheet 6.
J. G. NAYLOR & H. WILLIAMS.
APPARATUS FOR PRESSING BRICKS.
No. 490,412. Patented Jan. 24, 1893.
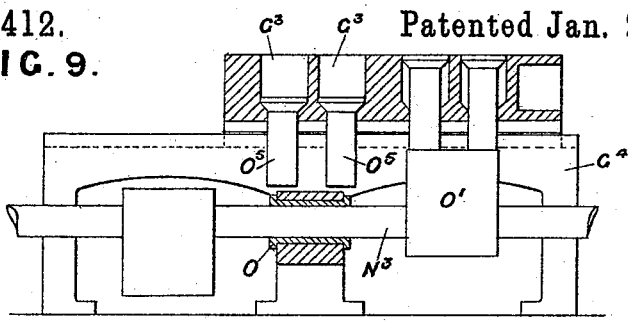
FIG. 9.
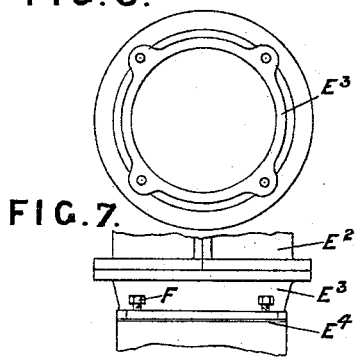
FIG. 6.
FIG. 7.
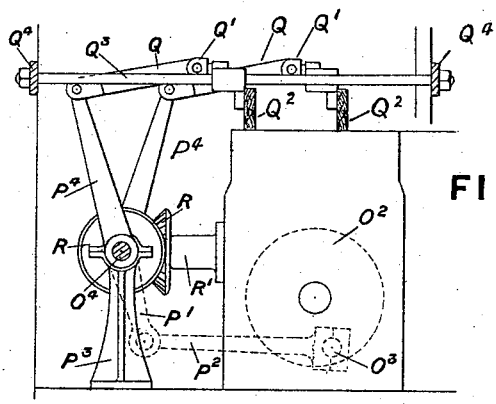
FIG. 8.
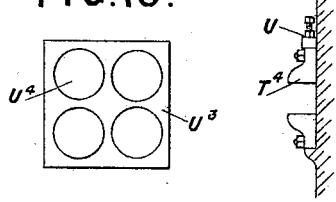
FIG. 10.  FIG. 11.
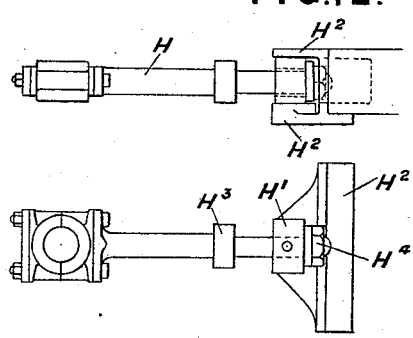
FIG. 12.
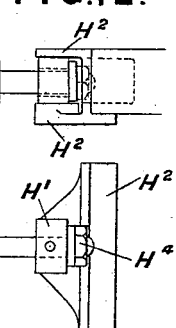
FIG. 13.
WITNESSES.
INVENTORS.

UNITED STATES PATENT OFFICE.

JOSHUA G. NAYLOR AND HARRY WILLIAMS, OF RICHMOND, VICTORIA.

APPARATUS FOR PRESSING BRICKS.

SPECIFICATION forming part of Letters Patent No. 490,412, dated January 24, 1893.

Application filed April 25, 1892. Serial No. 430,587. (No model.) Patented in Victoria November 20, 1888, No. 6,364; in New South Wales October 31, 1889, No. 1,808; in Queensland November 6, 1889, No. 1,123; in England March 4, 1890, No. 3,431; in New Zealand May 3, 1890, No. 4,359, and in South Australia October 28, 1890, No. 2,139.

*To all whom it may concern:*

Be it known that we, JOSHUA G. NAYLOR and HARRY WILLIAMS, engineers, subjects of the Queen of Great Britain and Ireland, both residing at Richmond, in the county of Bourke, in the Colony of Victoria, have invented a new and useful Improved Apparatus for Molding and Pressing Semi-Dry or Semi-Plastic Bricks, (for which we have obtained a patent in the following countries: Victoria, No. 6,364, dated November 20, 1888; New South Wales, No. 1,808, dated October 31, 1889; South Australia, No. 2,139, dated October 28, 1890; Queensland, No. 1,123, dated November 6, 1889; New Zealand, No. 4,359, dated May 3, 1890, and Great Britain, No. 3,431, dated March 4, 1890,) of which the following is a specification.

Our objects are, first, to provide a machine at once simple in construction, not liable to break down, and capable of doing a considerable quantity of good work, points which are of great importance, especially where skilled labor is not easily obtainable. Secondly, to produce a machine which will run at a high rate of speed for the purpose of effectually pressing or consolidating the particles of clay together, and which will turn out a greater number of bricks in a given time. Thirdly, to counter-balance the pressure which is applied to mold and press bricks during each revolution of the driving shaft, in order to avoid as much as possible the friction of the several parts.

The principal parts of the apparatus herein described consist of, first, a pug mill. Secondly, a sliding table (having two or four molds formed therein) which is arranged beneath the pug mill to constitute a molding machine. Thirdly, a press having two or four molds or dies. Fourthly, mechanism for advancing the bricks from the molding machine to the press and delivering them upon the discharge rollers. By these means the operations of pugging, molding, pressing and delivering are accomplished in due order. It is by reason of the compact combination of the various parts that the wear and tear are reduced to a minimum.

The nature of our invention, and the manner in which it is to be performed, will be readily understood on reference to the six accompanying sheets of drawings (shown in the scale of one inch to the foot), and to the following explanation thereof.

Figure 2:
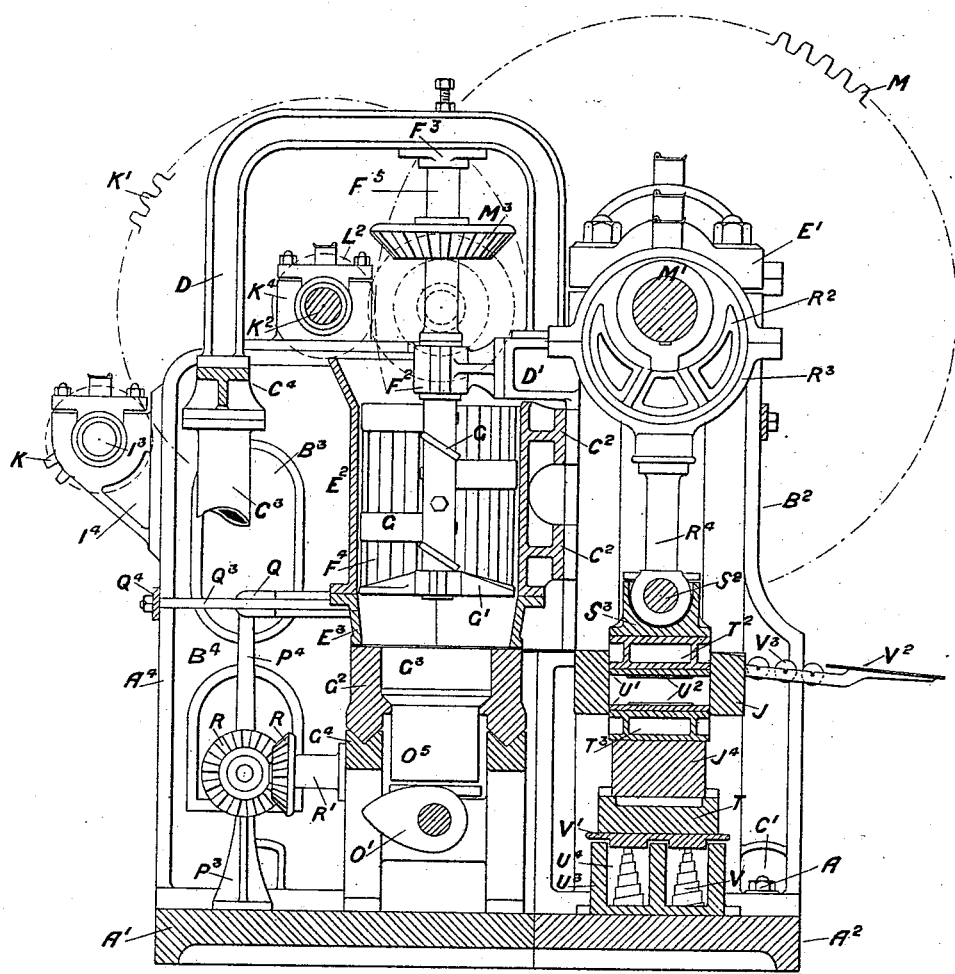
Figure 3:
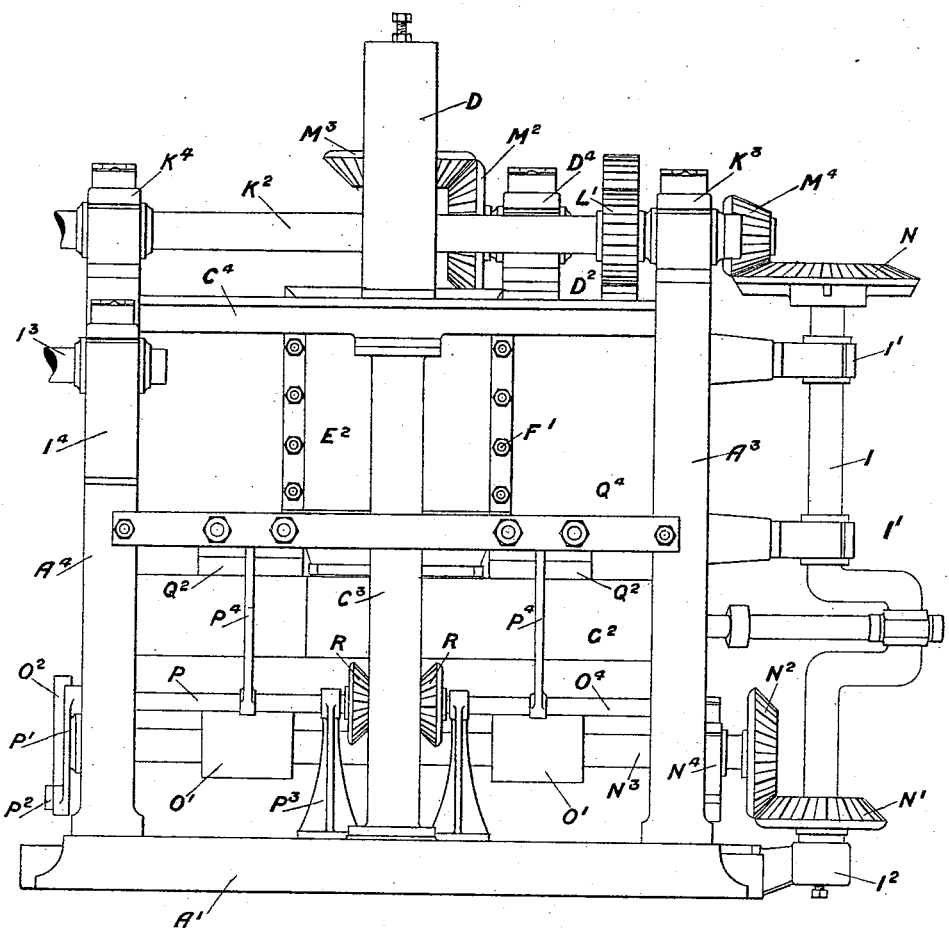
Figure 4:
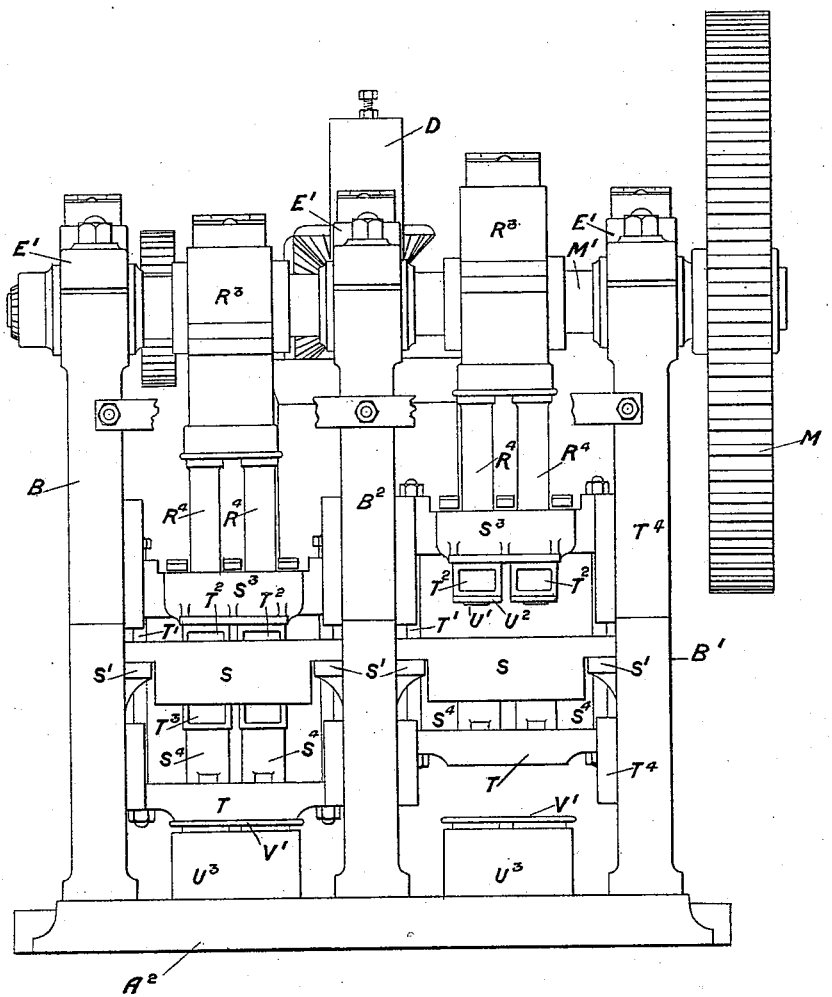
Figure 5:
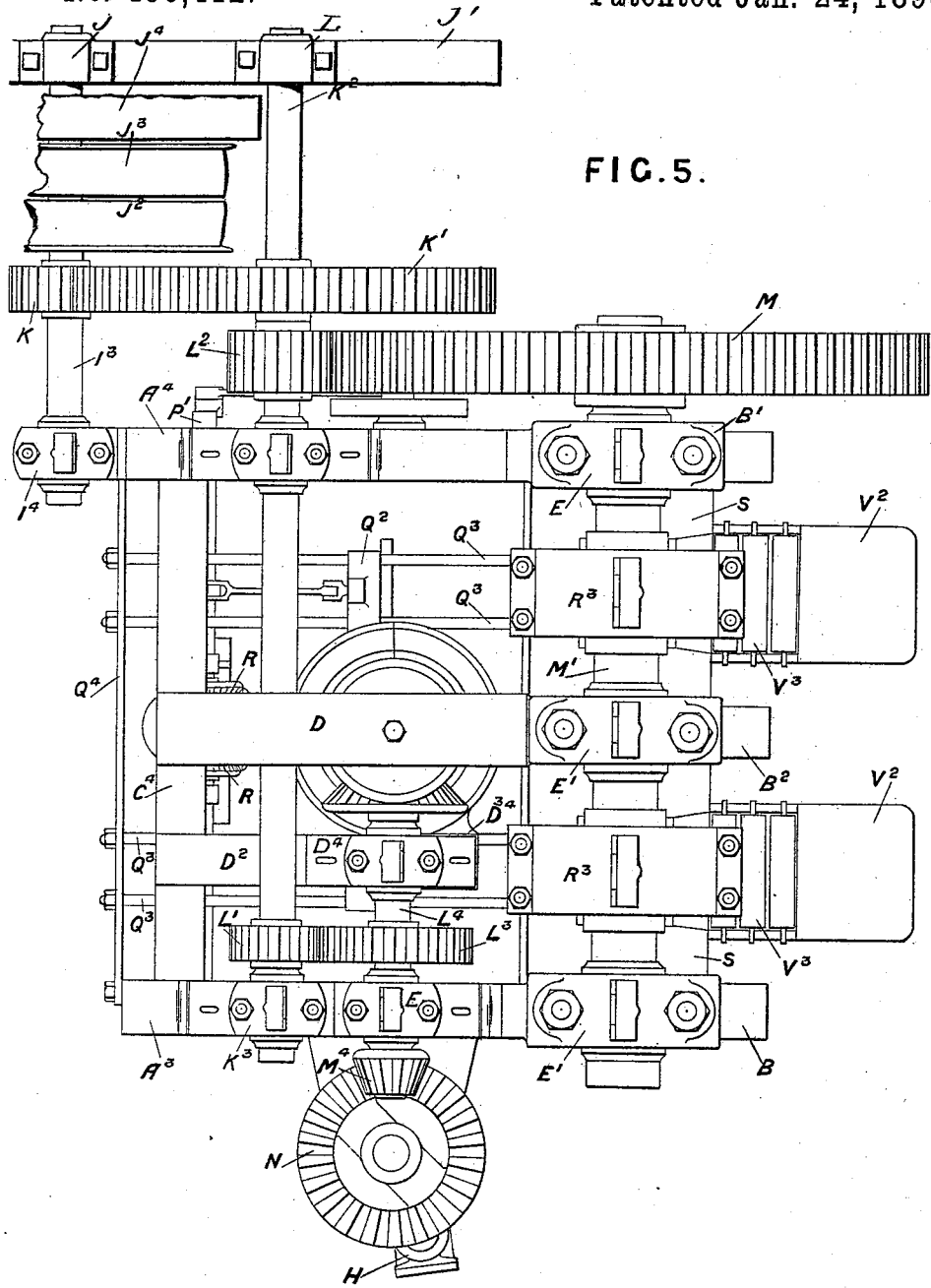

Figure 1, is a side elevation of the apparatus illustrating it without the driving gear. Fig. 2, is a sectional elevation of apparatus taken through the pug mill, sliding table, and press showing the form of molds in each of the two last mentioned parts. Fig. 3, represents a rear elevation of apparatus without the driving gear. Fig. 4, is a front elevation illustrating the press. The driving gear, and the crank which works the sliding table, are not shown. Fig. 5, is a plan of machine in its complete form. Fig. 6, represents an inverted plan of the lower end of pug mill cylinder. Fig. 7, is a detail view of the lower portion of pug mill, showing it provided with an adjustable circle plate and screws. Fig. 8, illustrates a separate view of the mechanism for advancing and delivering the molded-bricks (up-lifted from the molds in the sliding table) to and from the press. Fig. 9, is a section through the sliding table showing the four molds as also the relative positions of the plungers therein, with the cams, as the table remains momentarily stationary at one end of its stroke, to allow two of the molds to receive a charge of clay from the pug mill. Fig. 10, is a detail plan of one of two boxes containing each four volute or helical springs arranged beneath the uplifting plungers in the dies of press. Fig. 11, is a plan view illustrating the form of guide used for steadying the down pressing and up-lifting plungers of press. Figs. 12 and 13, are elevations of the rod which connects with one end of sliding table, and with a vertical crank shaft.

Similar letters of reference indicate similar or corresponding parts where they occur in the several views.

The drawings show the frame of apparatus consisting principally of two sides which are alike in construction, and a central wall or partition. These sides and the partition are each secured to a foundation-plate by means of two bolts similar to (A) and (*a*) Figs. 1 and 2. Said plate consists of two parts (A') and (A²) rigidly secured to a substantial foundation by four bolts passed through a corresponding number of ears or lugs. The sides are put together in four parts (A³) (A⁴) (B) and (B') Fig. 5 the former two of which act as sides of the molding machine, and the latter (B) and (B') form the sides of press. The partition or wall (B²) acts as a central support for the overhead cam shaft of press, and also as a medium to carry the pug mill cylinder hereinafter described.

The flanges horizontally formed upon each of the side frames are planed upon their lower faces to bed truly upon similarly planed raised surfaces or seatings projected from the upper surface of each of the two parts (A') and (A²) of bed plate. The faces of the vertically formed flanges are also planed and bolted together to connect the molding machine with the press. There are six flanged openings (five being shown) (B³) (B⁴) (*c*) (*c*) and (*c'*) formed in each of the two sides of apparatus. These should correspond with one another when said sides are set upon, and bolted to the faced-seatings of the foundation plate. The openings marked (B³) and (B³) are made in order to reduce the weight of each side, while (B⁴) and (B⁴) admit the pillow blocks in which the outer ends of two horizontal rocking shafts carrying the delivering mechanism are supported. Through the opening (*c*), passes a connecting rod which imparts a reciprocating motion to the sliding table of the molding machine. The remaining openings (*c'*) and (*c'*), likewise those corresponding therewith, receive the nuts upon the bolts which hold the sides and partition of machine to the foundation plate. The sixth opening allows a shaft carrying two cams and a miter-wheel and a cranked disk to pass through the sides (A³) and (A⁴) of machine. The partition (B²), has formed upon it two T shaped flanges, the faces of which are planed to allow corresponding feet (*c²*) and (*c²*) projected from the pug mill cylinder, to be bolted thereto. At the rear portion of machine frame is a tubular column (*c³*) formed with flanged faced ends, its lower end is bolted to a faced seating upon the foundation plate. Upon the upper end of said column rests one end of a yoke in the crest of which is formed a socket bearing to carry the upper end of the pug mill shaft.

(*c⁴*) is a T shaped cross piece, the ends of which are flanged and faced, and bolted to the side frames (A³) and (A⁴).

(D) represents the aforesaid yoke, which is extended across the upper portion of apparatus. Its rear end is bolted to the cross piece (*c⁴*), and the front end to the bracket (D') formed upon the partition.

(D²) is a bridge, the rear end of which is secured to the cross piece (*c⁴*), the front being bolted to the bracket (D³) formed upon the pug mill cylinder. (D⁴) is a pillow block secured to said bridge, to support one end of the pug mill driving shaft hereinafter described; the other end of this shaft is carried by a pillow-block (E) bolted to the side frame (A³). There are three bearing ways formed in the same planes one in each of the sides (B) and (B'), and also one in the partition (B²) of press. These ways are bored parallel with the planed or faced seatings upon the foundation plate, and each is fitted with a pair of cylindrically formed brasses, in which revolves a shaft termed the overhead shaft. There are two vertical cores formed in each of the side frames (B) and (B') likewise two in the central wall or partition. These cores receive bolts which retain in position the caps (E) (E') and (E') of the brasses of the bearing ways beforementioned, and assist in holding the two sides (B) and (B') as also the wall (B²) firmly upon the foundation plate.

(E²) represents the pug mill cylinder, the upper portion of which is flared outwardly. To its lower flanged end is bolted a slightly conically shaped flanged mouth (E³) provided with an adjustable circle plate (E⁴) Fig. 7 which is carried by four set screws similar to (F) tapped into ears or lugs projected from said mouth and plate. This circle plate (E⁴) can be so adjusted as to nearly touch the face of the sliding table, so that the clay will be cut off sharply from the molds in the latter and the pug mill. Said cylinder is made in two halves, which are secured together by the bolts similar to (F'). In its axis is arranged a shaft (F⁵) which revolves in two bearings one carried by the bracket (F²) projected from the central wall (B²), and the other supported by the socket (F³) formed in the yoke (D). The inner circumference of cylinder is fitted with a number of steel strips which form corrugations as at (F⁴) (Fig. 2) to prevent the clay revolving while being forced downwardly. Six or more steel blades similar to one lettered (G) are secured to said shaft (F⁵), having each a reduced end. These ends are of a hexagon shape and fitted into similar eyes formed across the axis of the shaft (F⁵).

The lower blades such as (G') termed spreaders are of a greater area in order to present more pressing surface to the clay while being forced into the molds of the sliding table (G²). In the body of this table there are four molds similar to (G³) Fig. 1, and upon its underside are two V guides which slide in correspondingly shaped guideways formed in the bed (G⁴) carrying said table. This bed is supported by six legs, the feet of which are bolted to raised seatings upon the foundation plate. The sliding table (G²) is reciprocated by a connecting rod (H) which slides in an oscillating piece (H') Fig. 12. This piece consists of a head (having a bushed eye) with two reduced ends turned cylindrically true, and fitted into sockets formed one in each of the cheeks (H²) and (H²) projected from one end of table (G²). A recess is also formed in this end to allow of the sliding motion of the rod (H) connecting with the crank shaft hereinafter described.

(H³) and (H⁴) are two steel collars set (six and one-quarter inches apart) the former one is shrunk upon the rod (H) and the latter screwed upon the reduced end of said rod to allow the table to stop momentarily at each end of the stroke.

(i) is the crank shaft carried by the two pillow blocks (i') and (i') bolted to the side frame (A³), its lower end is supported by a footstep bearing (i²) secured to the foundation plate.

(i³) is the driving shaft carried by the pillow block (j) and the bracket bearing (i⁴) which is secured upon the side frame (A⁴), the pillow block is bolted upon the wooden frame (j'). Said shaft is provided with a fast pulley (j²) as also with a loose one (j³), a fly wheel (j⁴), a pinion wheel (k), the latter gearing with a spur wheel (k') upon the intermediate shaft (k²). This shaft (k²) is carried by two pillow blocks (k³) and (k⁴) bolted to the side frames (A³) and (A⁴). One of its ends is extended beyond one side of machine and is supported by the pillow block (L) secured to wooden frame (j'). Said intermediate shaft carries two pinion wheels (L') and (L²), the former (L') meshes with the spur wheel (L³) carried by the horizontal shaft (L⁴) termed the pug mill driving shaft, the latter (L²) gears with the spur wheel (M) upon the overhead shaft (M') of press.

(L⁴) is the pug mill driving shaft, upon the inner end of which is arranged the miter gear wheel (M²) to mesh with a corresponding wheel (M³) secured to the vertical shaft (F⁵) of pug mill. The bevel gear pinion wheel (M⁴) upon the outer end of shaft (L⁴) meshes with the bevel gear wheel (N) carried by the vertical crank shaft arranged at one side of machine. Two miter wheels (N') and (N²) meshing with each other, communicate motion from said crank shaft to a horizontal shaft (N³) arranged beneath the sliding table. Two pillow blocks similar to (N⁴) are secured to the foundation plate to carry said shaft, and there is also a bearing (o) formed in one of the legs of the bed (G⁴) for the same purpose.

(o') and (o') are two cams made fast to said shaft (N³), one for each pair of uplifting plungers which work in the molds of sliding table.

The mechanism for advancing the bricks from the molding machine to the press, and from the latter to delivering rollers, consists of a crank disk (o²) keyed to a cam shaft (N³). (o³) is a crank pin secured in said disk.

(o⁴) and (P) are two rocking shafts. (P') a crank arm, and (P²) a rod connected to the pin (o³) and the crank arm (P'), one end of which is secured to shaft (P). The rocking shafts (o⁴) and (P) are supported by bearings similar to (P³) and (P³), two for each shaft.

(P⁴) and (P⁴) are two lever arms keyed one to each of the rocking shafts (o⁴) and (P). (Q) and (Q) are two links jointed to said lever arms. The other ends of the links are connected respectively by means of pins to the knuckle joints (Q') and (Q') which are extended from sliding blocks (Q²) and (Q²), provided each with two eyes one in each side to engage four guide rods lettered (Q³) two for each sliding block. They are held rigidly (in the position shown) by the bars (Q⁴) and (Q⁴) extended across, and secured by bolts to the flanges of the side frames (A³) and (A⁴).

(R) (R) and (R) are three miter wheels, the first secured to the shaft (o⁴) the second to the shaft (P), the third being carried by a short spindle which is turned cylindrically true, and fitted into the bearing provided in the bracket (R') projected from the bedblock (G⁴) beforementioned.

To the overhead shaft (M') of press are affixed two eccentrics similar to the one marked (R²) (Fig. 2) set at opposite angles and embraced by the straps (R³), and (R³), to which are connected four plungers lettered (R⁴), two for each pair of molds formed in the tables (s) and (s) of press. These tables are held rigidly in position by bolts passed through two flanges formed upon each table and also through lugs or ribbed flanges lettered (s') projected from the sides (B) and (B') and partition (B²) of press. The four down pressing plungers of the press each lettered (R⁴) are bored and faced to oscillate freely upon a pin such as (s²) (Fig. 2) having square ends rigidly secured in, and across a recess formed in each of the upper cross heads (s³) and (s³). The four uplifting plungers each lettered (s⁴) are carried by the two lower cross heads (T) and (T) (two plungers upon each of the latter) which are connected with the upper cross heads (s³) and (s³) by four bolts lettered (T').

(T²) (T²) (T²) and (T²) are four cast iron dies having recessed ends to allow them to be connected by screws to the aforesaid upper cross heads (s³) and (s³). Four dies similar to (T³) are bolted one to each of the plungers of the lower cross-heads and are similar in form to those upon the down pressing plungers. Two guideways similar to (T⁴) and (T⁴) are bolted to each of the two sides of press, and two to each side of the partition to steady the four crossheads (s³) (s³) (T) and (T). One strip of each pair of guideways may be adjusted by means of two set screws such as (U) Fig. 11.

The pressing surface of each of the dies herein described is fitted with a rectangular shaped plate such as (U') Figs. 2 and 4 secured by two screws. These plates carry each a brass plate (U²) which is secured thereto by countersunk set screws, and form the frog in the faces of the bricks.

A rectangular shaped chest is formed in the body of each die, into which steam is admitted for the purpose of heating the molds by which means a better finish or skin is given to the bricks.

The steam chests in each pair of down pressing dies, communicate with each other and also with the chests in the dies of the uplifting plungers by bent tubes of small diameter, a flexible tube forming the connection between each set of dies.

($U^3$) and ($U^3$) are square boxes provided each with four recesses such as ($U^4$) (Figs. 2 and 10) to receive four volute or helical springs similar to the one lettered (V). Each of the springs is made to resist pressure of five tons.

($v'$) and ($v'$) are two caps which rest upon said springs, and stand clear of the boxes one inch and three eighths each time the dies are not employed in compressing the clay. By the use of these springs the bricks in the molds of the press tables are compressed without any jar or vibration. The boxes have each two lugs at the bottom edges to allow them to be bolted to faced seatings upon the foundation plate of machine.

($v^2$) and ($v^2$) are two inclined discharge tables carrying each three rollers similar to ($v^3$). The ends of each of the latter are fitted into recesses or bearings formed in the arms or brackets secured to, and projected from, the tables of the press.

We do not confine ourselves to the use of four molds in the sliding table, as we may use two only. In this case two of the plungers beneath table, as also two dies of the press together with two molds therein would be dispensed with.

We are aware that brick making machines have been provided with sliding molds which have been charged with clay from a hopper, and also with mechanism for delivering the bricks upon an endless band, but there has been no provision made for effectually pressing the molded bricks.

The means employed are primitive, as the machine could not be driven at a high rate of speed without disastrous results, nor could the output of bricks with the sliding molds be more than one for every stroke of each mold.

Now in our machine four bricks are molded and pressed during each stroke of the sliding table, and each revolution of the driving shaft ($i^3$), consequently, thirty-three thousand bricks can be pressed per diem of ten hours, with the employment of an engine of ten horse power.

The clay from which the bricks are manufactured requires in general, no previous preparation beyond that given by the ordinary crushing rollers, and, in some cases may be put into the machine direct from the pit, unless it contains stones, when it is passed through a pair of rollers.

The operation of pugging, molding, pressing and delivering is as follows:—The clay when introduced into the cylinder ($E^2$) is forced downwardly by the blades (G) and the spreaders (G') into the two pairs of molds in sliding table. Each pair of these molds is charged alternately, that is to say, while the table is momentarily stopped at each end of its stroke. The table is then reciprocated by the crank shaft ($i$) imparting motion to the rod (H), the collar ($H^3$) then engages the oscillating eye piece (H'). The molds remain charged until the table reaches the termination of its outer stroke where it remains momentarily stopped until the other collar ($H^4$) engages the eye piece (H') to return the table to its instroke. During the foregoing stoppage of the table at the outstroke, the shaft ($N^3$) lifts the cam ($o'$) which consequently raises two plungers ($o^5$) and ($o^5$) as shown at Fig. 9, thereby lifting the two molded bricks level with the surface of the sliding table, from which position they are pushed forwardly by the sliding block ($Q^2$), toward the press, to be moved into the molds in the press table ($s$) by the two bricks subsequently molded, and uplifted from the said molds ($G^3$) and ($G^3$) in table ($G^2$) and pushed by the same sliding block ($Q^2$). During this operation of uplifting the bricks and delivering them to the press the other two molds ($G^3$) and ($G^3$) are charged with clay by the pug mill. The table is then reciprocated to its instroke position, by reason of the crank imparting motion to the rod which brings the collar ($H^4$) into contact with the eye piece (H'), then the shaft ($N^3$) lifts the cam ($o'$), which acting upon the plungers ($o^5$) and ($o^5$), the bricks are uplifted and advanced toward the press in a manner similar to that previously described in connection with the before-mentioned molds, at the outstroke end of sliding table. These molds being again charged, the table is reciprocated as before stated to the outstroke, when the molded bricks are uplifted, and advanced by sliding block ($Q^2$), of the delivering mechanism, which pushes the two bricks previously formed into two molds of press and between the dies ($T^2$) and ($T^2$) ($T^3$) and ($T^3$) where they are effectually pressed. The bricks are uplifted from the molds of the press to the surface of its table and pushed on the rollers ($v^3$) of discharge table by two subsequently formed bricks. The filling of the other molds ($G^3$) and ($G^3$) is performed in a precisely similar manner, then the table is reciprocated, and the bricks are discharged therefrom and afterward moved to the press by the sliding block ($Q^2$) of the delivery mechanism and discharged upon the rollers ($v^3$) of table ($s$) by the forward movement of two subsequently formed bricks. As the dies and plungers for each pair of molds in press descend, the lower cross heads bear upon the caps ($v'$) and ($v'$) whereby the springs ($v$) within the boxes ($U^3$) and ($U^3$) are depressed, thus forming a solid bed for the cross heads during each compression.

Having particularly described and explained the nature of our said invention and the manner in which the same is to be performed, what we desire to secure by Letters Patent is,—

1. In combination the pug mill the reciprocating table carrying a mold and arranged to move below the same to carry the said mold below the pug mill to receive the material and then to one side of the same, the vertically movable plunger in the mold and carried by the table, the means for moving the said plunger vertically when the table is at the limit of its outward movement, the press mechanism and the means for pushing the molded material when raised from the mold to the press mechanism, substantially as described.

2. In combination the pug mill the reciprocating table carrying two molds at different points thereon, so that while one is beneath the pug mill the other will be at one side thereof, the means arranged on both sides of the pug mill and in line with the movement of the table, the plunger in the said molds, the press mechanism, and the alternately sliding blocks for moving the molded material first from one side of the pug mill and then the other to the press mechanism, substantially as described.

3. In combination the pug mill, the reciprocating table carrying molds with plungers therein, the means for reciprocating the table so that the molds will be alternately presented to the opening in the pug mill and at one side thereof, the shaft, the cams O', arranged to act upon the plungers alternately at the limit of the table's movement, the press mechanism and the slides for pushing the molded material thereto, substantially as described.

4. The combination and arrangement of a crank, shaft ($i$) vertically arranged at one side of molding machine to actuate the sliding table ($G^2$) by means of a rod (H) with the collars ($H^3$) and ($H^4$) to alternately engage the eye-piece (H') at one end of said table, substantially as herein described and illustrated in our drawings.

5. The combination and general arrangement of the two rocking shafts ($o^4$) and (P) (worked by cranked disk) geared to work alternately the levers ($P^4$) and ($P^4$) provided with links (Q) and (Q) and sliding blocks ($Q^2$) and ($Q^2$) guided each by two rods, whereby the molded bricks are advanced from the sliding table to the press and thence to the rollers of discharge tables, substantially as herein described and as illustrated in our drawings.

Dated this 13th day of February, 1891.

JOSHUA G. NAYLOR.
HARRY WILLIAMS.

Witnesses:
ALBERT SWANSON,
HARRY COLEMAN.